US006235400B1

United States Patent
Natsubori et al.

(10) Patent No.: US 6,235,400 B1
(45) Date of Patent: May 22, 2001

(54) VIBRATION-ISOLATING LAMINAR RUBBER STRUCTURE HAVING RUBBER LAYERS WHOSE COMPOSITION INCLUDES AT LEAST ONE OF ASPHALT, TAR AND PITCH MATERIALS

(75) Inventors: Isao Natsubori; Kenji Yamamoto, both of Kasugai; Kyoichi Yamamoto, Komaki, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/428,165

(22) Filed: Oct. 27, 1999

(30) Foreign Application Priority Data

Apr. 26, 1999 (JP) .................................. 11-117957

(51) Int. Cl.[7] ...................................... B32B 15/06
(52) U.S. Cl. ......................... 428/468; 428/462; 428/465; 524/59; 524/66
(58) Field of Search ..................... 428/465, 468, 428/462, 457, 492, 500; 529/59, 66, 68

(56) References Cited

U.S. PATENT DOCUMENTS

| 4,016,665 | * | 4/1977 | Sakota | 40/135 |
| 5,324,758 | * | 6/1994 | Takahashi et al. | 524/59 |
| 5,354,828 | * | 10/1994 | Kawasaki et al. | 526/336 |
| 5,884,440 | * | 3/1999 | Kubo et al. | 52/167.7 |
| 5,998,513 | * | 12/1999 | Hashimoto | 524/64 |

* cited by examiner

Primary Examiner—D. S. Nakarani
Assistant Examiner—Christopher Paulraj
(74) Attorney, Agent, or Firm—Burr & Brown

(57) ABSTRACT

A vibration-isolating laminar rubber structure including highly rigid hard plates and rubber layers which are alternately laminated on each other, wherein the rubber layers are formed of a rubber composition comprising 1–50 parts by weight of at least one kind of material selected from among asphalt materials (e.g., natural asphalt), tar materials and pitch materials, per 100 parts by weight of a rubber material (natural rubber and/or diene-based synthetic rubber). The rubber composition preferably further comprises 10–150 parts by weight of carbon black and/or 1–50 parts by weight of a plasticizer having a freezing point of not higher than −30° C, per 100 parts by weight of the rubber material.

10 Claims, 1 Drawing Sheet

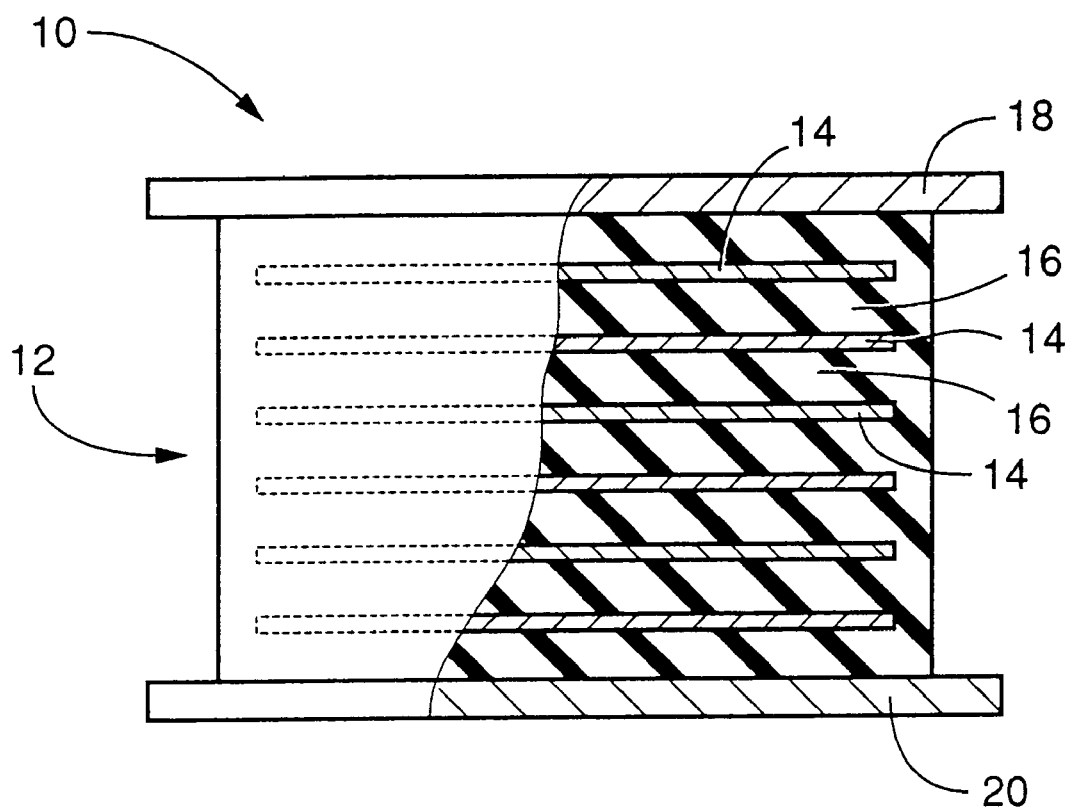

VIBRATION-ISOLATING LAMINAR RUBBER STRUCTURE HAVING RUBBER LAYERS WHOSE COMPOSITION INCLUDES AT LEAST ONE OF ASPHALT, TAR AND PITCH MATERIALS

This application is based on Japanese Patent Application No. 11-117957 filed Apr. 26, 1999, the content of which is incorporated hereinto by reference.

BACKGROUND OF THE INVENTION

1. Field of the Invention

The present invention relates in general to a vibration-isolating laminar rubber structure, and more particularly to a vibration-isolating laminar rubber structure suitably used as an elastic support or cushioning body for supporting a civil engineering structure or a building or architectural structure, in a vibration isolating or damping fashion. For instance, the laminar rubber structure is suitably used as a support interposed between a beam and a pier of a bridge.

2. Discussion of the Related Art

There has been known a vibration-isolating elastic support or cushioning body in the form of a laminar rubber structure used for supporting a structure in the fields of civil engineering and building or architectural construction. Such a laminar rubber structure is interposed between an upper structure and a lower structure. Since the upper structure to be supported by the laminar rubber structure usually has a considerably large weight, the laminar rubber structure is constructed to include metal plates or other hard plates having a high degree of rigidity, such that the hard plates and rubber layers are alternately laminated on each other to constitute a laminar structure, which is highly capable of functioning as an elastic support or cushioning body for supporting a building or architectural structure, or a bridge pier or other civil engineering structure, in a vibration damping or isolating manner.

Described in detail by reference to FIG. 1, a vibration-isolating laminar rubber structure 10 shown therein by way of example includes a rubber block 12 wherein a plurality of hard plates in the form of metal plates 14 are embedded in parallel with each other such that the metal plates 14 are spaced apart from each other at a predetermined spacing interval, so that the metal plates 14 and rubber layers 16 are alternately arranged to provide the rubber block 12 in the form of an integral laminar body. The laminar rubber structure 10 further includes an upper mounting plate 18 and a lower mounting plate 20, which are both formed of a metallic material and secured to the respective upper and lower end faces of the rubber block 12. The laminar rubber structure 10 is interposed between an upper structure such as a beam of a bridge and a lower structure such as a pier of the bridge, such that the laminar rubber structure 10 is fixed at the upper and lower mounting plates 18, 20 to the beam and pier of the bridge, respectively. The laminar rubber structure 10 is capable of supporting a relatively large weight of the upper structure such as a concrete bridge beam having a large weight, in a vibration damping or isolating fashion. The laminar rubber structure 10 exhibits a damping or cushioning effect in a shearing direction, for absorbing or accommodating deflection, flexure or displacement of the bridge beam which may be caused by an earthquake, a strong wind, or a weight or acceleration of vehicles running on the bridge. The laminar rubber structure 10 also exhibits a damping or cushioning effect for absorbing or damping a vibrational load which acts on the bridge beam in the vertical direction.

It will be understood that the vibration-isolating laminar rubber structure constructed as described above desirably is required to exhibit not only a high vibration isolating, damping or absorbing effect, but also a low dependency of its modulus of elasticity on the temperature. Generally, the laminar rubber structure is used at a temperature which varies over a relatively wide range, Where the laminar rubber structure is used for supporting a bridge beam on a pier, the laminar rubber structure is usually placed in a severe natural environment, being exposed to a below-freezing temperature up to a temperature far exceeding 30° C.

However, the rubber layers in the rubber block provided in the conventional vibration-isolating laminar rubber structure are formed of an ordinary rubber composition which is a mixture of a rubber material such as a natural rubber (NR) and a suitable vulcanizing agent. Such an ordinary rubber composition is not satisfactory in its vibration isolating or damping properties. Further, the inclusion of known components conventionally used to improve the isolating or damping properties causes an undesirable increase in the temperature dependency of the modulus of elasticity of the rubber layers, namely, undesirable deterioration of its elastic characteristics of the laminar rubber structure as a whole, due to a considerable influence by the ambient temperature.

SUMMARY OF THE INVENTION

It is therefore an object of the present invention to provide a vibration-isolating laminar rubber structure which exhibits an improved vibration isolating or damping effect, and reduced temperature dependency of its elastic characteristics.

The above object may be achieved according to the principle of this invention, which provides a vibration-isolating laminar rubber structure including highly rigid hard plates and rubber layers which are alternately laminated on each other, wherein the rubber layers are formed of a rubber composition comprising 1–50 parts by weight of at least one kind of material selected from among asphalt materials, tar materials and pitch materials, per 100 parts by weight of a rubber material.

The vibration-isolating laminar rubber structure of the present invention constructed as described above is characterized in that the rubber composition of the rubber layers interposed between the adjacent hard plates such as metal plates comprises a suitable amount of at least one kind of material selected from among asphalt materials, tar materials and pitch materials. The inclusion of the above-indicated at least one kind of material is effective to enable the laminar rubber structure to exhibit improved vibration isolating or damping properties, and reduced temperature dependency of elastic characteristics such as modulus of elasticity. Accordingly, the present vibration-isolating laminar rubber structure is capable of providing an improved damping or cushioning effect in a shearing direction, for efficiently absorbing or accommodating deflection, flexure or displacement of a bridge beam, for example, which may be caused by an earthquake, a strong wind, or a weight or acceleration of vehicles running on the bridge. Further, the laminar rubber structure is also capable of providing a damping or cushioning effect for absorbing or damping a vibrational load, which acts on the bridge beam in the vertical direction.

In one preferred form of this invention, the rubber material includes as a major component at least one of a natural rubber and a synthetic diene rubber.

In another preferred form of the invention, the rubber composition further comprises 10–150 parts by weight of carbon black, per 100 parts by weight of the rubber material, so as to reduce or eliminate an increase in the temperature dependency of the elastic characteristics of the laminar rubber structure, which would be caused by the inclusion of at least one kind of material selected from among asphalt materials, tar materials and pitch materials. Preferably, the carbon black consists of at least one kind of carbon selected from HAF carbon, ISAF carbon and SAF carbon.

In a further preferred form of this invention, the asphalt materials and the pitch materials have a softening point not lower than 110° C., so that not only the isolating or damping properties of the laminar rubber structure are further improved, but also the temperature dependency of the elastic characteristics is significantly reduced. In particular, natural asphalt materials are preferably used as the asphalt materials.

In a yet further preferred form of the invention, the rubber composition further comprises 1–50 parts by weight of a plasticizer having a freezing point not higher than –30° C. The inclusion of the plasticizer permits the laminar rubber structure to maintain its excellent isolating or damping properties owing to the at least one kind of material selected from among the asphalt, tar and pitch materials, while minimizing the temperature dependency of the elastic characteristics such as the modulus of elasticity.

BRIEF DESCRIPTION OF THE DRAWING

The above and other objects, features, advantages and technical and industrial significance of this invention will be better understood by reading the following detailed description of the invention, when considered in connection with the accompanying drawing, in which the single FIGURE is an elevational view partly in cross section showing an example of a laminar rubber body to which the present invention is applicable.

DETAILED DESCRIPTION OF THE INVENTION

Referring to the drawing, a vibration-isolating laminar rubber structure 10 shown therein includes a rubber block 12, and an upper mounting plate 18 and a lower mounting plate 20 which are fixed to the respective upper and lower end faces of the rubber block 12. The rubber block 12 is a rubber mass in which a plurality of metal plates 14, 14 are embedded in a spaced-apart parallel relationship with each other at a predetermined spacing interval, such that the metal plates 14 and rubber layers 16 are alternately laminated on each other so as to form a laminar structure in the form of the rubber block 12. The rubber layers 16 are formed of a unique rubber composition according to the principle of this invention.

The rubber composition whose major component is a rubber material comprises a suitable amount of at least one kind of material selected from among asphalt materials, tar materials and pitch materials, which are considered to be effective to improve the vibration isolating or damping properties of the rubber block 12, while minimizing or eliminating an increase in the temperature dependency of the elastic characteristics of the rubber block 12.

The asphalt materials may be selected from among not only various kinds of natural asphalt materials, but also petroleum asphalt materials such as straight asphalt, blown asphalt and cut-back asphalt. The tar materials may be selected from among coal tar, shale tar, wood tar, oil gas tar, petroleum tar and refined tar. The pitch materials may be selected from among coal tar pitch, wood tar pitch and rosin pitch. In the present invention, it is particularly preferable to use at least one of asphalt and pitch materials which has a softening point not lower than 110° C., desirably a natural asphalt material or materials whose softening point is 110° C. or higher, for enabling the laminar rubber structure to exhibit significantly improved vibration isolating or damping properties, and a considerably low degree of temperature dependency of its elastic characteristics or properties.

The content of the above-indicated at least one kind of material included in the rubber composition for improving the isolating or damping properties of the laminar rubber structure is suitably determined depending upon the desired isolating or damping properties. For achieving a sufficient improvement of the isolating or damping properties, the rubber composition must comprise at least one part by weight, preferably, at least five parts by weight of such material or materials, per 100 parts by weight of the rubber material. Since the temperature dependency of the elastic characteristics of the rubber block 12 including the rubber layers 16 is undesirably increased, the content of the above-indicated at least one kind of material should not exceed 50 parts by weight, preferably, 30 parts by weight, per 100 parts by weight of the rubber material.

In addition to the at least one kind of material selected from among the asphalt, tar and pitch materials, it is desirable to further add carbon black to the rubber composition, for the purpose of preventing or minimizing an adverse effect of the asphalt, tar and/or pitch materials on the temperature dependency of the elastic characteristics. Preferably, the rubber composition further comprises 10–150 parts by weight of carbon black, per 100 parts by weight of the rubber material. It is desirable to use the carbon black whose primary particle size is about 30 nm or smaller. Preferably, the carbon black consists of at least one kind of carbon selected from HAF carbon, ISAF carbon and SAF carbon. Of these kinds of carbon, the SAF carbon whose particle size is comparatively small is most preferable. The carbon black, whose particle size is generally small, is also effective to improve the vibration isolating or damping properties of the rubber block 12 or laminar rubber structure 10.

For minimizing the temperature dependency of the elastic characteristics of the present vibration-isolating laminar rubber structure 10, it is also desirable that the rubber composition further comprises a plasticizer having a freezing point not higher than –30° C., in addition to the above-indicated at least one kind of material for improving the vibration isolating or damping properties. The plasticizer may consist of at least one kind selected from among: phthalate-based plasticizers such as dibutyl phthalate (DBP) and dioctyl phthalate (DOP); adipate-based plasticizers such as dioctyl adipate (DOA), diisodecyl adipate (DIDA), dibutyl glycol adipate and dibutyl carbitol adipate; sebacate-based plasticizers such as dioctyl sebacate (DOS); and dibutyl sebacate (DBS); phosphate-based plasticizers such as tricresyl phosphate (TCP), cresyl phenyl phosphate (CDP), tributyl phosphate (TBP), trioctyl phosphate (TOP) and tributoxyethyl phosphate (TBXP); di-2-ethylhexyl azelate (DOZ); and di-2-ethylhexyl dodecanedioate (DODN).

Preferably, the rubber composition comprises 1–50 parts of the plasticizer per 100 parts by weight of the rubber material. More preferably, the rubber composition comprises 2–25 parts by weight of the plasticizer. If the content of the plasticizer is smaller than one part by weight, the effect of the plasticizer to reduce the temperature dependency is not sufficient. If the content of the plasticizer is larger than 50 parts, the compatibility of the plasticizer with the other components of the rubber composition is deteriorated, leading to bleeding of the plasticizer from the outer surfaces of the rubber block 12 (rubber layers 16).

The rubber material included as a major component of the rubber composition in addition to the above-indicated at least one kind of material for improving the vibration isolating or damping properties may be selected from among various known rubber materials used for a conventional vibration-isolating laminar rubber structure, preferably from among natural rubbers and synthetic diene rubber materials. The synthetic diene rubber materials may be selected from among synthetic polyisoprene rubber, styrene-butadiene rubber, polybutadiene rubber, butyl rubber, halogenated butyl rubber and acrylonitrile-butadiene rubber.

The rubber composition for the rubber layers 16 of the rubber block 12, which comprises the rubber material and the above-indicated at least one kind of material selected from the asphalt, tar and pitch materials and which may optionally comprise the carbon black and plasticizer, usually further comprises a suitable amount of a vulcanizing agent such as sulfur, and may optionally comprise a suitable amount or amounts of: a vulcanization accelerator; a vulcanization aid such as stearic acid or zinc oxide (zinc flower); a softener such as an oil; a wax; an anti-aging agent; and any other agents or components as included in the conventional rubber composition.

The vibration-isolating laminar rubber structure 10 may be manufactured by any one of various methods known in the art, by using the rubber composition. For instance, the laminar rubber structure 10 may be manufactured by first positioning the metal plates 14, or the metal plates 14 and the upper and lower mounting plates 18, 20, in a suitable vulcanizing mold, and filling the mold with the rubber composition formulated according to the present invention. With the rubber composition being vulcanized, the rubber layers 16 each interposed between the adjacent metal plates 14 are bonded to the metal plates 16, whereby the rubber block 12 is manufactured with or without the mounting plates 18, 20. Alternatively, the rubber layers 16 are formed of the rubber composition, and these rubber layers 16 and the metal plates 14 are alternately laminated on each other, using a suitable bonding adhesive, to obtain the integral rubber block 12.

The metal plates 14 used as the highly rigid hard plates in the vibration-isolating laminar rubber structure according to the present invention are preferably iron or steel plates having a high value of compressive strength, but may be made of other metallic materials. Further, the metal plates 14 may be replaced by hard plastic plates having a sufficiently high value of compressive strength.

The laminar rubber structure 10 may have any desired overall configuration, depending upon the specific application. For instance, the laminar rubber structure 10 has an elliptical shape, or a pentagonal, hexagonal or any other polygonal shape, as well as a square, rectangular or circular shape, in transverse cross section taken in a plane parallel to the metal plates 14 and rubber layers 16. The numbers of the metal plates 14 and the rubber layers 16 may be suitably determined depending upon the specific application of the laminar rubber structure 10.

EXAMPLES

To further illustrate the present invention, there will be described some examples of the invention. It is to be understood that the invention is not limited to the details of these examples, but may be embodied with various changes, modifications and improvements, which may occur to those skilled in the art, without departing from the spirit and scope of the invention defined in the appended claims.

There were prepared 13 rubber compositions (Examples 1–13) according to the present invention, and two rubber compositions as Comparative Examples 1 and 2. The components and their contents of each composition are indicated in TABLES 1, 2 and 3. The prepared rubber compositions were vulcanized at 150° C. for 30 minutes to obtain test specimen pieces (S1 type), which were subjected to testing for evaluating their damping coefficient and temperature dependency G, according to JIS-K-6394-1976 (Testing Method for Dynamic Properties of Rubber Vulcanizates). The evaluated damping coefficient and temperature dependency G are also indicated in TABLES 1–3.

To prepare the rubber compositions, there were used: natural rubber (NR), butadiene rubber (BR) or synthetic isoprene rubber (IR) as the rubber material; naphthenic process oil or aroma oil as the softener; coal tar pitch as the pitch material; refined tar as the tar material; and straight asphalt 80–100, or natural asphalt having a softening point of 120° C., as the asphalt material. In TABLES 1–3, "DOP" represents dioctyl phthalate (having a freezing point of –50° C.) as the plasticizer, and "MSA" and "TBT" respectively represent N-oxydiethylene-2-benzothiazole sulfenamide and tetrabutyl thiuram disulfide as the vulcanization accelerator. In addition to the vulcanization accelerator, zinc oxide ZnO (zinc flower) and stearic acid were used as the vulcanization aid. The SAF carbon and the HAF carbon as the carbon black had primary particle sizes of 19 nm and 30 nm, respectively.

In the testing of each test specimen piece, its load-deflection curve or loop was obtained by a non-resonance method defined in JIS-K-6394-1976, under the following conditions:

Testing temperatures: –10° C., 20° C. and 40° C.
Vibration frequency: 0.5 Hz
Mean strain (shearing): 0%
Strain amplitude (shearing): 175%

Based on the obtained load-deflection loop, absolute values of complex spring constant $|K^*|(-10°\,C.)$ and $|K^*|(40°\,C.)$, and sine of loss angle $\sin \delta$ at 20° C. were obtained. Based on the obtained values $|K^*|(-10°\,C.)$, $|K^*|(40°\,C.)$ and sine of loss angle $\sin \delta$, the vibration damping coefficient and the temperature dependency G of the absolute value of complex spring constant (stiffness) of each test specimen piece were calculated according to the following equations:

$$\text{Damping coefficient} = (\sin \delta)/2$$

$$G = |K^*|(-10°\,C.)/|K^*|(40°\,C.)$$

It will be understood from TABLES 1–3 that all of the rubber compositions of Examples 1–13 according to the present invention exhibited a significant improvement in the damping coefficient, without a significant increase in the temperature dependency of the absolute value of complex spring constant. In particular, the rubber compositions of Examples 9–13 which use the natural asphalt and the plasticizer (DOP) exhibited a considerable improvement in the damping coefficient, and a sufficiently low value of temperature dependency of the complex spring constant. A comparison of the rubber compositions of Examples 2 and 8 with each other reveals that the use of the SAF carbon whose primary particle size (19 nm) is smaller than that (30 nm) of the HAF carbon produced a better result regarding the damping coefficient. On the other hand, the rubber compositions of Comparative Examples 1 and 2 which do not include any asphalt, tar or pitch materials suffered from unsatisfactory damping properties with a considerably low damping coefficient.

TABLE 1

| | Rubber Compositions (wt. %) According to the Invention | | | | |
|---|---|---|---|---|---|
| Components | 1 | 2 | 3 | 4 | 5 |
| NR | 100 | 20 | — | — | 100 |
| BR | — | 80 | 100 | — | — |
| IR | — | — | — | 100 | — |
| SAF carbon | 100 | 80 | 80 | 90 | 90 |
| Naphthene process oil | 18 | 8 | 8 | 8 | 8 |
| Pitch | — | — | — | — | 20 |
| Straight asphalt | 15 | 10 | 10 | 20 | — |
| MSA | 1 | 1 | 1 | 1 | 1 |
| Sulfur | 1.25 | 1.5 | 1.5 | 1.5 | 1.5 |
| TBT | 0.4 | 0.4 | 0.4 | 0.4 | 0.4 |
| ZnO | 5 | 5 | 5 | 5 | 5 |
| Stearic acid | 1 | 1 | 1 | 1 | 1 |
| Damping coefficient | 0.130 | 0.140 | 0.134 | 0.136 | 0.130 |
| G (temp. dependency) | 1.35 | 1.32 | 1.27 | 1.27 | 1.3 |

TABLE 2

| | Rubber Compositions (wt. %) According to the Invention | | | | |
|---|---|---|---|---|---|
| Components | 6 | 7 | 8 | 9 | 10 |
| NR | 100 | 100 | 20 | 100 | — |
| BR | — | — | 80 | — | 100 |
| SAF carbon | 90 | — | — | 80 | 80 |
| HAF carbon | — | 90 | 80 | — | — |
| Naphtene process oil | 8 | 8 | 8 | — | — |
| Aroma oil | — | — | — | 8 | 8 |
| Tar | 20 | — | — | — | — |
| Straight asphalt | — | 20 | 10 | — | — |
| Natural asphalt | — | — | — | 10 | 10 |
| DOP | — | — | — | 5 | 5 |
| MSA | 1 | 1 | 1 | 1 | 1 |
| Sulfur | 1.5 | 1.5 | 1.5 | 1.5 | 1.5 |
| TBT | 0.4 | 0.4 | 0.4 | 0.4 | 0.4 |
| ZnO | 5 | 5 | 5 | 5 | 5 |
| Stearic acid | 1 | 1 | 1 | 1 | 1 |
| Damping coefficient | 0.130 | 0.120 | 0.130 | 0.145 | 0.144 |
| G (temp. dependency) | 1.3 | 1.3 | 1.32 | 1.27 | 1.23 |

TABLE 3

| | Rubber Compositions (wt. %) | | | | |
|---|---|---|---|---|---|
| | According to the Invention | | | Comparative Examples | |
| Components | 11 | 12 | 13 | 1 | 2 |
| NR | — | 20 | 20 | 100 | 80 |
| BR | — | 80 | — | — | 20 |
| IR | 100 | — | 80 | — | — |
| SAF carbon | 80 | 80 | 80 | 80 | 80 |
| Naphtene process oil | — | — | — | 25 | 25 |
| Aroma oil | 8 | 8 | 8 | — | — |
| Natural asphalt | 10 | 10 | 10 | — | — |
| DOP | 5 | 5 | 5 | — | — |
| MSA | 1 | 1 | 1 | 1 | 1 |
| Sulfur | 1.5 | 1.5 | 1.5 | 1 | 1 |
| TBT | 0.4 | 0.4 | 0.4 | 0.6 | 0.6 |
| ZnO | 5 | 5 | 5 | 5 | 5 |
| Stearic acid | 1 | 1 | 1 | 1 | 1 |

TABLE 3-continued

| | Rubber Compositions (wt. %) | | | | |
|---|---|---|---|---|---|
| | According to the Invention | | | Comparative Examples | |
| Components | 11 | 12 | 13 | 1 | 2 |
| Damping coefficient | 0.144 | 0.144 | 0.144 | 0.098 | 0.098 |
| G (temp. dependency) | 1.25 | 1.25 | 1.27 | 1.4 | 1.23 |

What is claimed is:

1. A vibration-isolating laminar rubber structure including metal plates and rubber layers which are alternately laminated on each other, wherein said rubber layers are formed of a rubber composition comprising 1–50 parts by weight of a natural asphalt material having a softening point of 110° C. or more per 100 parts by weight of a rubber material, in a total amount of 1–50 parts by weight per 100 parts by weight of said rubber material.

2. The vibration-isolating laminar rubber structure according to claim 1, wherein said rubber material includes as a major component at least one of a natural rubber or a synthetic diene rubber.

3. The vibration-isolating laminar rubber structure according to claim 1, wherein the rubber composition further comprises a tar material selected from the group consisting of coal tar, shale tar, wood tar, oil gas tar, petroleum tar, and refined tar.

4. The vibration-isolating laminar rubber structure according to claim 1, wherein the rubber composition further comprises a pitch material selected from the group consisting of coal tar pitch, wood tar pitch, and rosin pitch.

5. The vibration-isolating laminar rubber structure according to claim 1, wherein said rubber composition further comprises 10–150 parts by weight of carbon black, per 100 parts by weight of said rubber material.

6. The vibration-isolating laminar rubber structure according to claim 5, wherein said carbon black consists of at least one kind of carbon selected from HAF carbon, ISAF carbon or SAF carbon.

7. The vibration-isolating laminar rubber structure according to claim 5, wherein said carbon black has a primary particle size not larger than about 30 nm.

8. The vibration-isolating laminar rubber structure according to claim 1, wherein the rubber composition further comprising 1–50 parts by weight of a plasticizer having a freezing point not higher than −30° C., per 100 parts by weight of said rubber material.

9. The vibration-isolating laminar rubber structure according to claim 8, wherein said rubber composition comprises 2–25 parts by weight of said plasticizer.

10. The vibration-isolating laminar rubber structure according to claim 8, wherein said plasticizer is selected from among: dibutyl phthalate (DBP); dioctyl phthalate (DOP); dioctyl adipate (DOA); diisodecyl adipate (DIDA); dibutyl glycol adipate; dibutyl carbitol adipate; dioctyl sebacate (DOS); dibutyl sebacate (DBS); tricresyl phosphate (TCP); cresyl phenyl phophate (CDP); tributyl phosphate (TBP); trioctyl phosphate (TOP); tributoxyethyl phosphate (TBXP); di-2-ethylhexyl azelate (DOZ); and di-2-ethylhexyl dodecanedioate (DODN).

* * * * *